US012809375B2

(12) United States Patent
Navas Sanchez et al.

(10) Patent No.: US 12,809,375 B2
(45) Date of Patent: Nov. 24, 2026

(54) POSITIONING AUTONOMOUS VEHICLES

(71) Applicant: Hewlett-Packard Development Company, L.P., Spring, TX (US)

(72) Inventors: Borja Navas Sanchez, Sant Cugat del Valles (ES); Ramon Viedma Ponce, Sant Cugat del Valles (ES); Aviv Hassidov Pleser, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 237 days.

(21) Appl. No.: 17/417,204

(22) PCT Filed: Jul. 31, 2019

(86) PCT No.: PCT/US2019/044388

§ 371 (c)(1),
(2) Date: Jun. 22, 2021

(87) PCT Pub. No.: WO2021/021163

PCT Pub. Date: Feb. 4, 2021

(65) Prior Publication Data

US 2022/0155793 A1 May 19, 2022

(51) Int. Cl.
*G05D 1/00* (2024.01)

(52) U.S. Cl.
CPC .................................. *G05D 1/0236* (2013.01)

(58) Field of Classification Search
CPC .................................................... G05D 1/0236
See application file for complete search history.

(56) References Cited

U.S. PATENT DOCUMENTS 7,539,557 B2 5/2009 Yamauchi
8,050,863 B2 11/2011 Trepagnier et al.
(Continued)

FOREIGN PATENT DOCUMENTS

CN 103075963 B 9/2015
KR 100825919 B1 4/2008
WO WO-2015151101 A1 10/2015

OTHER PUBLICATIONS

Robohub, "LiDAR vs RADAR: A detailed comparison," 2017. https://robohub.org/lidar-vs-radar-a-detailed-comparison/ (Year: 2017).*
(Continued)

*Primary Examiner* — Stephanie T Su
(74) *Attorney, Agent, or Firm* — Jordan IP Law, LLC

(57) ABSTRACT

In an example, a method comprises, for an autonomous vehicle: coarsely positioning a first signal beam emitter located on the vehicle in line with a first alignment target and coarsely positioning a second signal beam emitter located on the vehicle in line with a second alignment target, wherein the first and second alignment targets are each aligned with a predefined grid. The method may include emitting a first signal beam from the first signal beam emitter towards the first alignment target and emitting a second signal beam from the second signal beam emitter towards the second alignment target. The method may further include monitoring a first return signal beam from the first alignment target and adjusting at least one of a position and an orientation of the vehicle based at least in part on the first return signal beam and determining that alignment is complete based at least in part on the first return signal beam.

15 Claims, 5 Drawing Sheets

(56) References Cited

U.S. PATENT DOCUMENTS

| | | | | |
|---|---|---|---|---|
| 9,916,703 | B2 | 3/2018 | Levinson et al. | |
| 10,742,969 | B1 * | 8/2020 | Rohatgi | H04N 17/002 |
| 2014/0210663 | A1 * | 7/2014 | Metzler | G01S 19/07<br>342/357.34 |
| 2015/0081156 | A1 | 3/2015 | Trepagnier et al. | |
| 2016/0349746 | A1 | 12/2016 | Grau | |
| 2017/0211937 | A1 | 7/2017 | Hu et al. | |
| 2017/0297568 | A1 | 10/2017 | Kentley et al. | |
| 2018/0086381 | A1 * | 3/2018 | Hoffman, Jr. | B62D 15/0285 |
| 2018/0209815 | A1 | 7/2018 | Chung et al. | |
| 2019/0331482 | A1 * | 10/2019 | Lawrence | G01B 11/2755 |
| 2020/0174107 | A1 * | 6/2020 | Briggs | H04N 23/90 |
| 2020/0372664 | A1 * | 11/2020 | He | G01S 17/931 |

OTHER PUBLICATIONS

Merriam-Webster, "target" (Year: 2009).*
Wang, et al., Realtime Glass Detection With Laser Rangefinders for Robot Navigation and Mapping, Dec. 2015, ResearchGate, 6 pages, available at https://www.researchgate.net/publication/291337892.

* cited by examiner

POSITIONING AUTONOMOUS VEHICLES

BACKGROUND

Sensors may be used to determine the position of autonomous vehicles relative to their environment, for example to monitor how far along a route the vehicle is or whether the vehicle is maintaining an intended path.

BRIEF DESCRIPTION OF THE DRAWINGS

Non-limiting examples will now be described with reference to the accompanying drawings, in which.

DETAILED DESCRIPTION

Autonomous vehicles may be used, for example, as surface marking robots for drawing or printing lines on a surface by depositing print agent while moving along the surface. Such autonomous vehicles may be used in building and industrial applications, where high precision positioning, e.g. of lines produced by a surface marking robot, may be useful. Furthermore, autonomous vehicles such as, for example, a surface marking robot or a surface scanning robot, may be used in an indoor environment, or another environment where there may be a lack of reference objects which the autonomous vehicles can use to determine their position.

Global positioning systems, such as a set of Ultra Wide Band (UWB) or ultrasound beacons, may be used to monitor the global position of an autonomous vehicle as it moves around an environment. These beacons can send and receive signals to each other so that the relative locations of the beacons can be determined. The beacons can also send and receive signals to and from the autonomous vehicle in order to determine the location of the autonomous vehicle relative to the beacons. However, the autonomous vehicle may also need to be aligned with the environment itself, for example for construction applications, or other applications where the autonomous vehicle needs to be accurately positioned or orientated in particular locations in the environment, or needs to interact with the environment (e.g. marking a particular point on the floor). Therefore a calibration or set up may be performed to position or orientate the autonomous vehicle at a particular predetermined point in the environment while measuring the vehicle's location using the beacons, to effectively align the coordinate system of the beacons and the vehicle with the environment.

Figure 1:
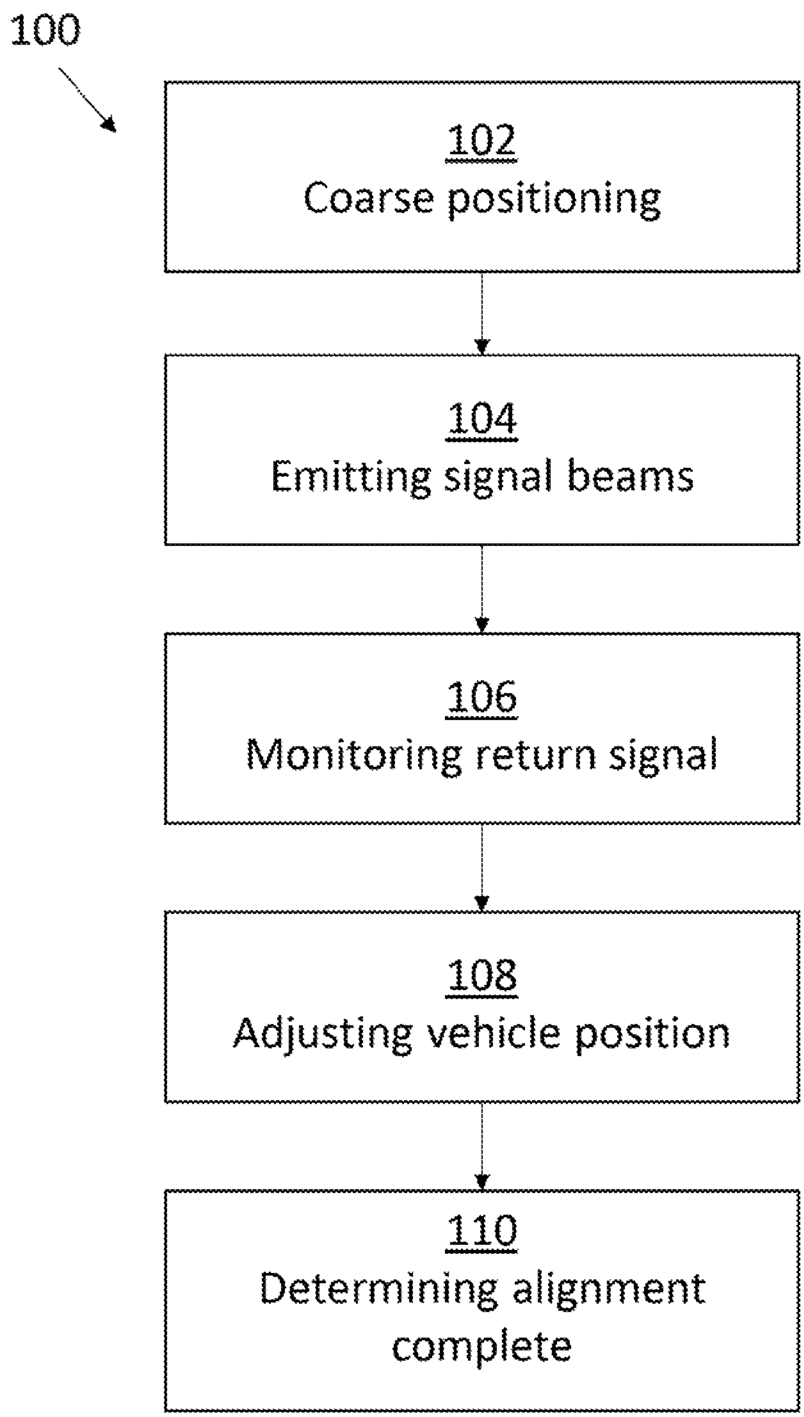
FIG. 1 shows a schematic flow chart of an example method.

FIG. 1 shows a method 100, which may be a method for aligning an autonomous vehicle. Block 102 of the method comprises coarsely positioning a first signal beam emitter located on the vehicle in line with a first alignment target and coarsely positioning a second signal beam emitter located on the vehicle in line with a second alignment target, wherein the first and second alignment targets are each aligned with a predefined grid.

In some examples, the coarse positioning may be performed automatically by the vehicle, for example using cameras on the vehicle. In other examples, the coarse positioning may comprise a user placing the vehicle on a spot which is approximately aligned with the first and second alignment targets. In some environments, such as construction environments, there may already be a predefined grid set up or marked on the floor, in which case the calibration may be to line the autonomous vehicle up with this grid. In other examples the predefined grid may be defined in another way, e.g. by a coordinate system used in a CAD file or image file that defines a route the vehicle is to take within the environment. The first and second alignment targets may be positioned e.g. on walls or on the floor of the environment. The first and second signal beam emitters may be located on the vehicle so that the first and second signal beams are emitted in different directions, which may be perpendicular to each other, positioning the emitters to emit signal beams in perpendicular directions may enable the beams to be more easily lined up with a predefined grid. In some examples the first signal beam is emitted in a heading direction (or direction of forward motion) of the vehicle. E.g. the first signal beam may be referenced to a wheel axis of the vehicle such that the beam is emitted perpendicular to this axis. The second signal beam may be emitted in a direction perpendicular to the first signal beam e.g. parallel to the wheel axis. In some examples, where the vehicle is a surface marking robot, the second signal beam may be emitted in a direction in line with, and referenced to, a nozzle head axis of the surface marking robot, which may help to improve the positional accuracy of lines printed by the nozzles. The first and second alignment targets may be positioned in the environment such that the first signal beam can be aligned with the first alignment target and the second signal beam can simultaneously be aligned with the second alignment target. The first and second alignment targets may each be located on a reference gridline of the predefined grid, such that the vehicle can be placed at an intersection of these gridlines at block 102. The first alignment target may comprise a reflective surface to return a signal beam emitted from the first signal beam emitter to the vehicle. The second alignment target may comprise a similar reflective surface or may comprise a mark or line in the environment (e.g. on the floor) to which the second signal beam can be manually aligned. In this example the second signal beam emitter may be a visible wavelength laser to enable a user of the vehicle to visually check whether the second signal beam is aligned with a particular mark in the environment.

Block 104 of method 100 comprises emitting a first signal beam from the first signal beam emitter towards the first alignment target and emitting a second signal beam from the second signal beam emitter towards the second alignment target. The signal beam emitters may be lasers, which may be part of a laser rangefinder system or photoelectric sensor.

Block 106 comprises monitoring a first return signal beam from the first alignment target and block 108 comprises adjusting at least one of a position and an orientation of the vehicle based at least in part on the first return signal beam. If the vehicle is aligned, the signal beam will be reflected back towards the vehicle. A first sensor on the vehicle may be used to monitor the first return signal beam. The first sensors may be part of a laser rangefinder system or photoelectric sensor. In some examples, block 106 further comprises monitoring a second return signal from the second alignment target and block 108 further comprises adjusting at least one of a position and an orientation of the vehicle based on both the first and second return signals. In some examples, the method may comprise automatically adjusting the position and/or orientation of the vehicle and in some examples the method may comprise manually adjusting the position and/or orientation of the vehicle.

In some cases, if the vehicle is not yet correctly aligned, the signal beam will not be reflected back towards the vehicle (e.g. it may be absorbed by a part of the alignment target or other material in the environment). In that case the return signal beam may have a low or zero intensity at the vehicle.

In some examples, the first and/or second alignment targets may be such that if the vehicle is not yet correctly aligned, the signal beam will be reflected back to the vehicle but with a different path length or intensity, as explained in more detail below. In some examples, the return signal may therefore provide information on whether the vehicle is moving closer towards or further away from alignment. In some examples, the method may comprise monitoring the first and/or second return signal beam while adjusting the position and/or orientation of the vehicle to determine whether the signal beam is moving towards or away from an alignment area on the alignment target; and automatically adjusting the position and/or orientation of the vehicle to move the signal beam towards the alignment area. Automatic adjustment based on feedback from the sensor may make the alignment set up quicker. In some examples, the vehicle may be adjusted randomly or may move in a predefined pattern until the vehicle either determines that alignment is complete or determines that the alignment has failed.

In some examples, one or both of the alignment targets may comprise an angled reflective surface to reflect the first signal beam back to the vehicle, such that a first beam path length depends on a location of incidence of the first signal beam on the angled reflective surface. In some examples, one or both of the alignment targets may comprise a reflective alignment area to reflect the first signal beam back to the vehicle if the vehicle is aligned with the first alignment target, and an absorptive area to absorb the first signal beam if the vehicle is not aligned with the first alignment target.

Block 110 comprises determining that alignment is complete based on the first and second return signal beams. For example, a return signal of a particular intensity or path length as detected by a sensor on the vehicle may indicate that the alignment is complete. In some examples, the method 100 comprises continuing to adjust an orientation and/or a position of the vehicle until the vehicle is aligned. In some examples the method 100 may comprise continuing to adjust the orientation/position of the vehicle for a predetermined amount of time and then displaying an indication that alignment has failed and/or that a user should perform the coarse positioning again, or returning to an automatic coarse positioning procedure. In some examples, if a user attempts to proceed with using the vehicle within the environment before a successful alignment has been determined, the vehicle may display a warning, or may store, or send to a user a notification recording that alignment was not successfully performed, for future reference.

The method of FIG. 1 enables an accurate alignment of the vehicle within a particular environment, enabling the vehicle to accurately move to particular points in the environment, for example to provide accurate surface marking on a floor in an indoor construction environment, e.g. for layout processes. In some examples, a heading accuracy of the autonomous vehicle of ±0.0023° for a 50 m path length (a lateral deviation of 2 mm) may be achieved. The method may therefore enable improved positioning accuracy while reducing the need to use complex equipment such as total stations. Furthermore, the method may enable an autonomous vehicle to be accurately positioned in an environment while using a global positioning system that comprises a set of beacons, or other system that tracks relative position. In some examples, where layout processes are to take place over multiple floors, UWB beacons could be left in place e.g. on a ground floor, and the vehicle could be moved to an upper floor, and then signals from the beacons below could still be used to position the vehicle without requiring realignment. This could simplify and speed up such processes.

Figure 2A:
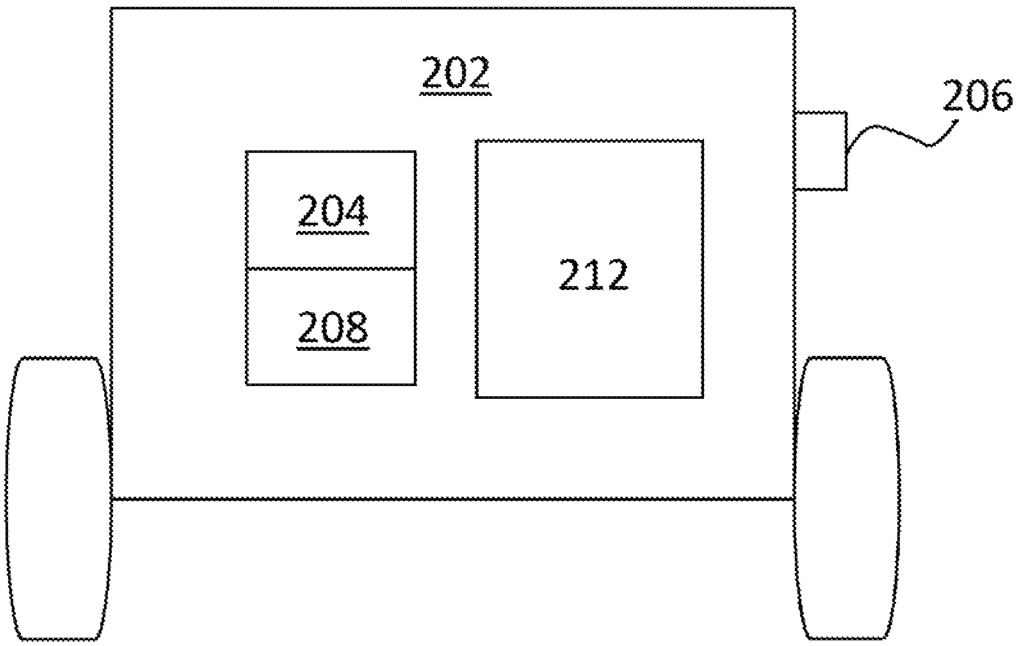
FIGS. 2A and 2B show schematic representations of example apparatuses comprising an autonomous vehicle.

FIG. 2A shows a schematic representation of an autonomous vehicle 202, which may be to carry out the method of FIG. 1. The autonomous vehicle 202 comprises a first laser 204 and a second laser 206. The first laser 204 may be mounted on the autonomous vehicle 202 to emit light in a direction parallel to a movement (or heading) direction of the autonomous vehicle 202. Mounting the first laser in line with a heading direction may help to improve the accuracy of a heading orientation of the vehicle. In some examples, the second laser 206 may be mounted on the autonomous vehicle 202 to emit light in a direction perpendicular to the heading direction. In some examples, the autonomous vehicle 202 may be a surface marking robot which comprises a nozzle or a set of nozzles and the second laser 206 may be mounted on the autonomous vehicle 202 in a direction in line with the nozzle head axis. In some examples, the autonomous vehicle may comprise a third laser mounted on an opposite side of the vehicle from the second laser, in line with the second laser to emit light in a direction opposite to the second laser. This may help improve the accuracy of manual alignment of the second laser with a second alignment target.

The autonomous vehicle 202 also includes a first sensor 208 to receive light from the first laser 204 after reflection back towards the autonomous vehicle 202 from a first alignment target. In some examples, the first laser 204 and the first sensor 208 may be housed together in a rangefinder laser/photoelectric sensor system. The autonomous vehicle 202 may also include a second sensor 210 to receive light from the second laser 206 after reflection back towards the autonomous vehicle 202 from a second alignment target. In some examples, the second laser 206 and the second sensor 210 may be housed together in a rangefinder laser/photoelectric sensor system.

Figure 2B:
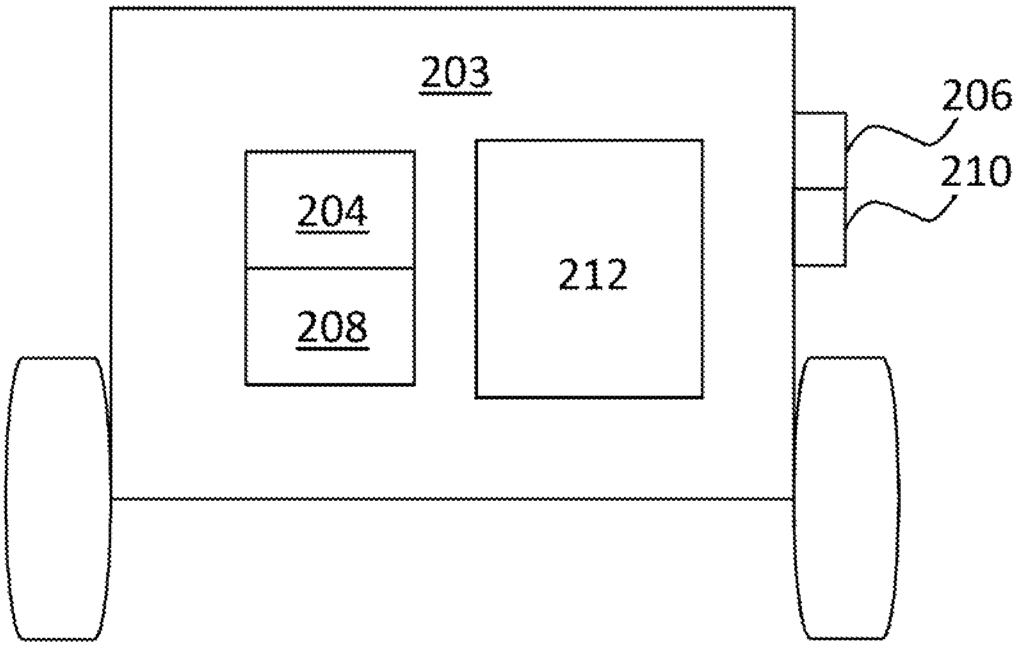

The autonomous vehicle 202 also includes processing circuitry 212 to receive sensor data from the first sensor 208 and determine that the autonomous vehicle is aligned with the first alignment target based on the sensor data, and in response, to output a signal indicating that the autonomous vehicle is aligned. In the example shown in FIG. 2 the processing circuitry 212 is located on board the autonomous vehicle 202, but in some examples, the processing circuitry may be located off the vehicle, but in communication with the sensors of the autonomous vehicle e.g. via a Bluetooth, Wi-Fi or other wireless connection. In some examples, outputting a signal indicating that the autonomous vehicle 202 is aligned may comprise, for example, turning on or changing an indicator light (e.g. an LED on the vehicle), displaying a message or other indicator on a display located on the autonomous vehicle 202, or sending a signal to a display via a wireless signal from the vehicle 202.

FIG. 28 shows a schematic representation of an autonomous vehicle 203, which is similar to the autonomous vehicle 202 of FIG. 2A, but additionally includes a second sensor 210 to receive light from the second laser 206 after reflection back towards the autonomous vehicle 202 from a second alignment target. In some examples, the second laser 206 and the second sensor 210 may be housed together in a rangefinder laser/photoelectric sensor system. In some examples, the processing circuitry 212 is to additionally receive sensor data from the second sensor and to determine that the autonomous vehicle is aligned with both the first and second alignment targets based on the first and second sensor data.

In some examples the processing circuitry 212 is to determine, based on sensor data received from the first and second sensors 208, 210, that the autonomous vehicle 202 is not aligned with both the first and second alignment targets, and in response, to control a motion control system of the autonomous vehicle 202 to adjust at least one of a position and an orientation of the vehicle 202. For example, the position and/or orientation of the vehicle 202 may be continuously adjusted while the first and second lasers 204, 206 continue to emit light and the sensors 208, 210 continue to monitor for a particular return signal. In some examples, the position and/or orientation may by adjusted randomly or following a predetermined scanning path. In some examples the processing circuitry is to determine, based on the sensor data, which direction to move the autonomous vehicle. When a return signal indicating alignment is received by the sensors 208, 210 (e.g. light of a particular intensity or path length or a combination of these factors), the processing circuitry 212 may determine that the autonomous vehicle is aligned, and in response, the processing circuitry 212 may then stop adjustment of the position and/or orientation of the vehicle. In some examples the processing circuitry 212 may also cause an indicator to be displayed, indicating that the autonomous vehicle 202 is aligned. Aligning the vehicle in this way may provide greater accuracy than a manual alignment.

Figure 3:
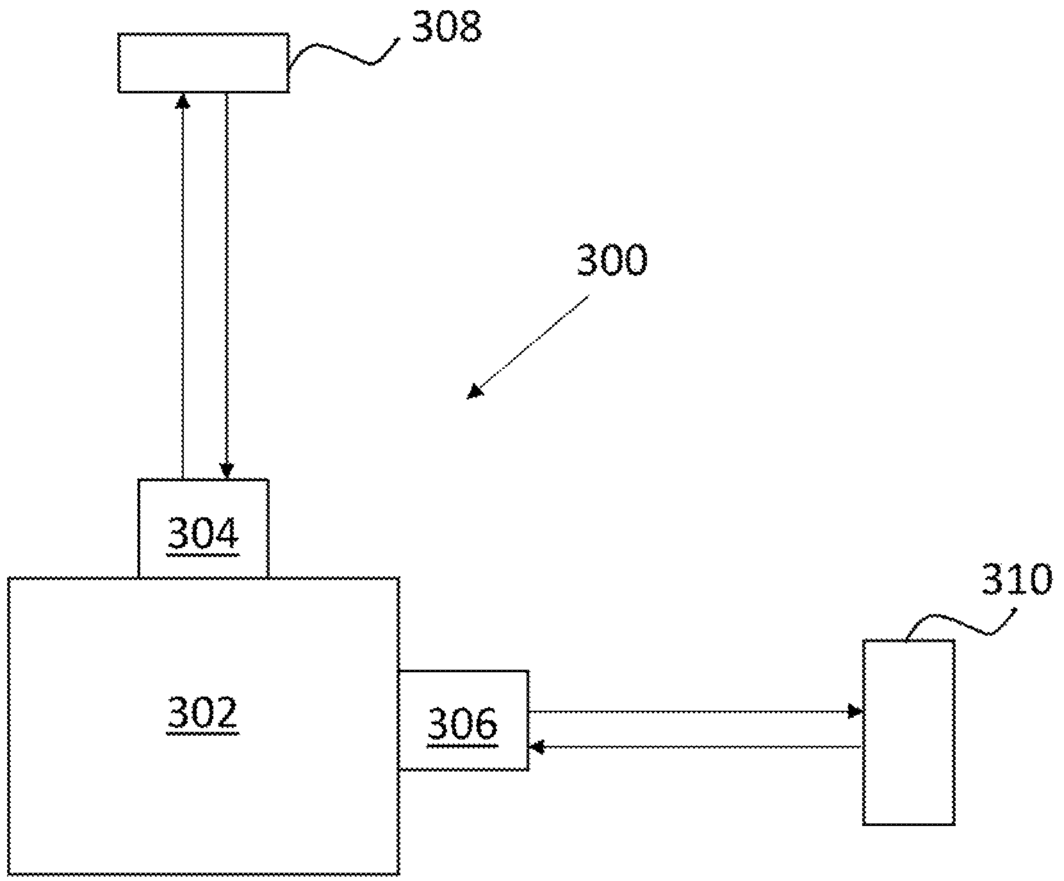
FIG. 3 shows a schematic representation of an example apparatus comprising an autonomous vehicle and first and second alignment targets.

FIG. 3 shows an example of an apparatus 300 comprising an autonomous vehicle 302, which may be similar to the autonomous vehicle 202 described above in relation to FIG. 2. The autonomous vehicle 302 comprises a first rangefinder laser system 304 (including a laser and a sensor) and a second rangefinder laser system 306. The apparatus 300 also comprises a first alignment target 308 and a second alignment target 310. The first alignment target 308 and second alignment target 310 are positioned such that the first rangefinder laser system 304 can be aligned with the first alignment target 308 and the second rangefinder laser system 306 can simultaneously be aligned with the second alignment target 310.

Figure 4:
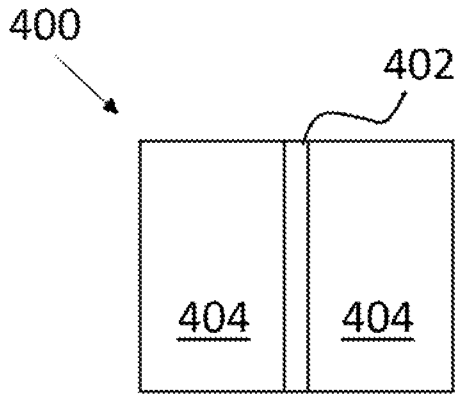
FIG. 4 shows a schematic representation of an example alignment target of the apparatus of FIG. 3.

FIG. 4 shows an example of an alignment target 400 that may form the first and/or second alignment target 308, 310 in the apparatus of FIG. 3. The alignment target 400 comprises a reflective portion 402 to reflect light emitted by a laser that is correctly aligned with the target 400, which is bordered on either side by an absorptive area 404 to absorb light emitted by a laser which is not correctly aligned with the target 400. For example, the reflective area 402 may be formed from a mirrored surface and the absorptive area may be formed from a black matt surface. In some examples the reflective area may be surrounded on all sides by the absorptive area. In some examples the reflective area may be bordered by the absorptive area on two sides, for example where an autonomous vehicle is to control a laser to move in a certain plane, the absorptive areas may be positioned to absorb light emitted over a certain distance either side of the reflective area, in that plane. An alignment target as shown in FIG. 4 may improve the accuracy with which the signal beam can be aligned with the target.

Figure 5:
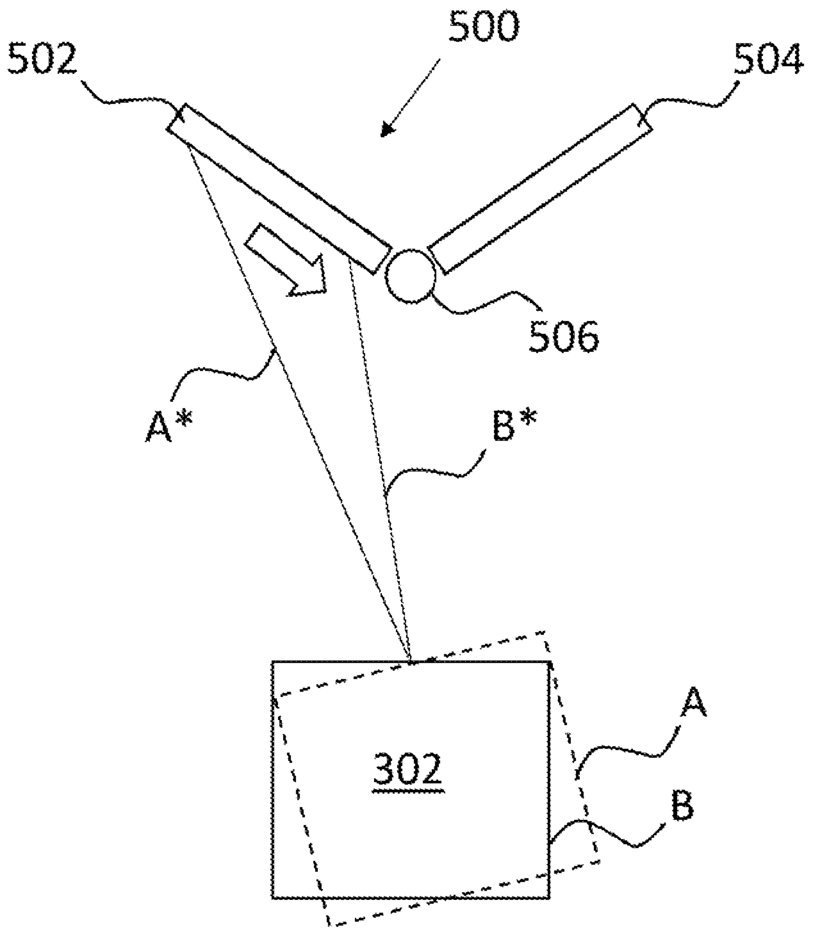
FIG. 5 shows a schematic representation of another example alignment target of the apparatus of FIG. 3 in use.

FIG. 5 shows another example of an alignment target 600 that may be used as the first and/or second alignment target 308, 310, in use, along with the autonomous vehicle 302. The alignment target 500 comprises a first reflective surface 502 and a second reflective surface 504, positioned on either side of a central reflective area 506, to form a V shape. The central reflective area 506 is positioned such that when a laser beam is incident on the central reflective area, the laser beam (and also therefore the autonomous vehicle) is aligned with the alignment target 500. The first and second reflective surfaces 502 and 504 are formed from a diffusely reflective material such as matt white paint. The first reflective surface 502 and the second reflective surface 504 are angled to reflect light emitted by a laser on the vehicle 302 back to the vehicle 302 such that a beam path length of light emitted by the laser depends on a location of incidence of the light on the angled reflective surface. In the example shown in FIG. 5, the reflective surfaces 502 and 504 are each positioned at angles such that a light beam incident on the reflective surface at a point closer to the central reflective area will travel along a shorter path length than alight beam incident on the reflective surface at a point further from the alignment area. In some examples, other arrangements of reflective surfaces, which cause a path length of alight beam to depend on a location of incidence of the light on the reflective surface may be used. For example, a concave or convex shape, or first and second flat reflective surfaces positioned either side of a central reflective area but angled such that a path length of a light beam emitted from a vehicle in front of the target will increase as the light beam moves from one side of the target towards the central reflective area (i.e. an inverted ‘V’ shape).

As shown in FIG. 5, as the vehicle 302 moves from a first position in which it is relatively further from alignment (shown as position A in FIG. 5) to a second position in which it is relatively closer to alignment (shown as position B in FIG. 5), an incidence point of a light beam emitted from a laser located on the vehicle 302 moves closer towards the central reflective area. The path of the light beam from the vehicle when in the first position (shown as A* in FIG. 5) is longer than the path of the light beam (shown as B* in FIG. 5) from the vehicle when in the second position. Therefore, the vehicle can determine whether it is moving closer or further away from the central reflective area of the alignment target and which direction to move next to bring the vehicle closer into alignment. The alignment target 500 has a symmetrical arrangement, so if the light beam moves post the central area the path length will start to increase again. This information can be used to control the vehicle to change direction, to move it towards alignment.

Figure 6:
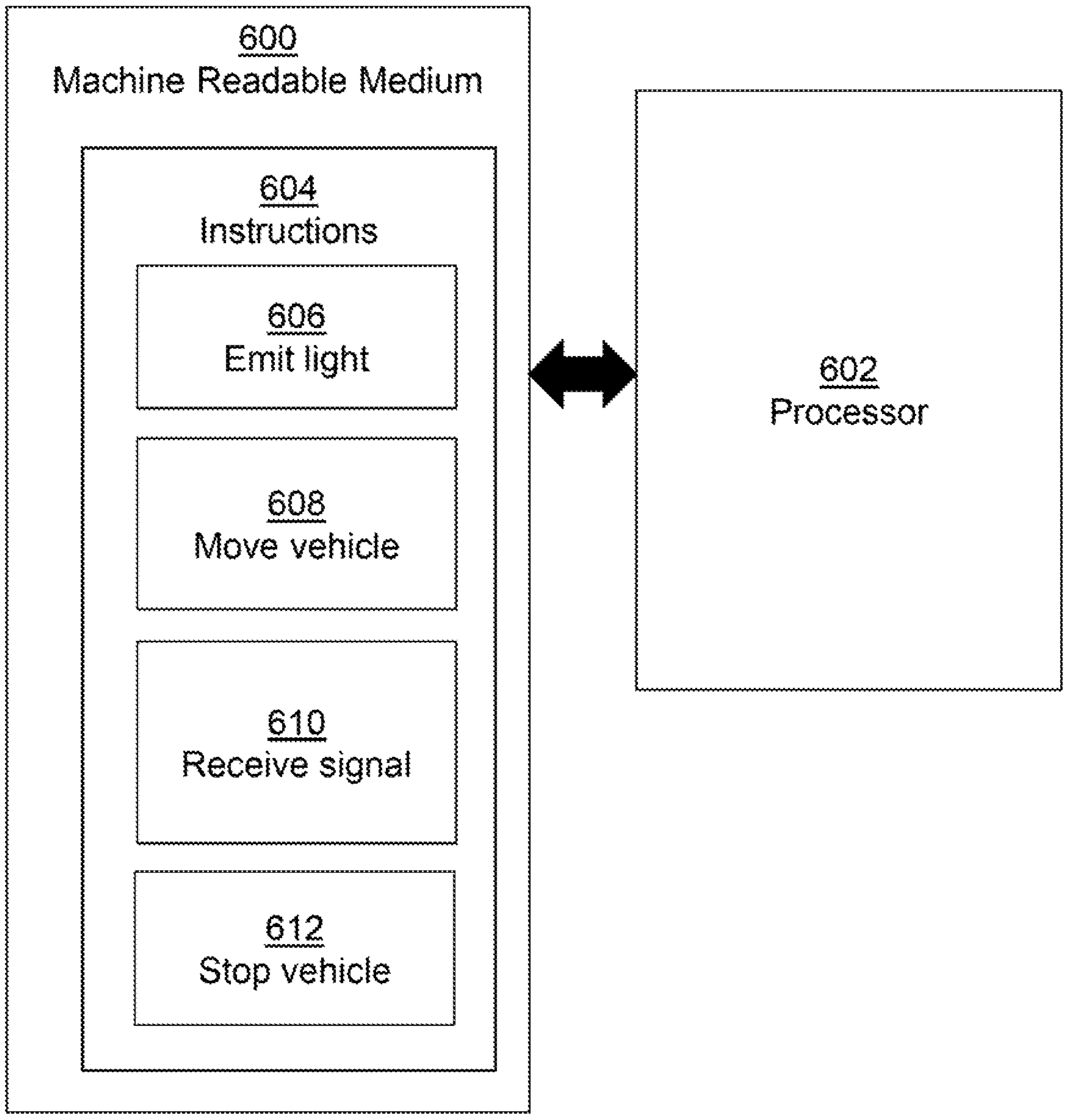
FIG. 6 shows a schematic representation of an example machine readable medium and processor.

FIG. 6 shows a machine-readable medium 600 in combination with a processor 602. In some examples the machine-readable medium is included in an autonomous vehicle as described in relation to FIG. 2 or 3 (for example the machine readable medium may be located on the vehicle or in wireless communication with the vehicle). In some examples, the machine-readable medium may be to perform the method of FIG. 1.

The machine-readable medium 600 has a set of instructions 604 stored thereon. Block 606 comprises instructions which, when executed by the processor 602 cause the processor 802 to control an autonomous vehicle, including first and second lasers and first and second sensors, wherein the first laser is orientated in a direction perpendicular to the second laser, to emit light from the first and second lasers.

Block 608 comprises instructions to cause the processor to control the autonomous vehicle to move, i.e. to control a motion control system of the autonomous vehicle to adjust a position and/or orientation of the vehicle. Block 610 comprises instructions to receive signals from the first and second sensors, and if the first sensor receives a reflected signal of light emitted by the first laser from a first target and the second sensor receives a reflected signal of light emitted by the second laser from a second target meeting at least one predetermined criterion, the instructions at block 612 are to cause the processor to stop the autonomous vehicle and output a signal indicating that the autonomous vehicle is aligned to the first and second target. For example, the predetermined criterion may be receiving a reflected signal from both targets simultaneously, which may be determined from sensor data indicating path length or intensity of the reflected signal.

In some examples, controlling the autonomous vehicle to move comprises instructing the processor to receive or acquire sensor data representing a reflected signal from the first target and a reflected signal from second target and controlling, by the processor, the autonomous vehicle to move in a particular direction based on the received sensor data.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

It shall be understood that some blocks in the flow charts can be realized using machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term ‘processor’ is to be interpreted broadly to include a CPU, processing unit. ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode. Further, some teachings herein may be implemented in the form of a computer software product, the computer software product being stored in a storage medium and comprising a plurality of instructions for making a computer device implement the methods recited in the examples of the present disclosure.

The word “comprising” does not exclude the presence of elements other than those listed in a claim, “a” or “an” does not exclude a plurality, and a single processor or other unit may fulfil the functions of several units recited in the claims.

The features of any dependent claim may be combined with the features of any of the independent claims or other dependent claims.

What is claimed is:

1. A method comprising, for an autonomous vehicle:

positioning a first signal beam emitter located on the autonomous vehicle not in line with a first alignment target and positioning a second signal beam emitter located on the autonomous vehicle not in line with a second alignment target, wherein the first and second alignment targets are both aligned with one predefined grid, and wherein the autonomous vehicle is on a planar surface;

emitting a first signal beam from the first signal beam emitter towards the first alignment target and emitting a second signal beam from the second signal beam emitter towards the second alignment target;

monitoring a return of the first signal beam from the first alignment target and aligning the autonomous vehicle to the first alignment target while the autonomous vehicle moves on its own and adjusting at least one of a position and an orientation of the autonomous vehicle based at least in part on the return of the first signal beam; and determining that the aligning of the autonomous vehicle to the first alignment target is complete based at least in part on the return of the first signal beam.

2. A method according to claim 1 further comprising monitoring a return of the second signal beam from the second alignment target and adjusting at least one of a position and an orientation of the autonomous vehicle based on the return of the first and second signal beams, and determining that alignment of the autonomous vehicle to the first and second alignment targets is complete based on the return of the first and second signal beams.

3. A method according to claim 1 further comprising:

monitoring the return of the first signal beam while adjusting the position and/or orientation of the autonomous vehicle to determine whether the first signal beam is moving towards or away from an alignment area on the first alignment target; and automatically adjusting the position and/or orientation of the autonomous vehicle to move the first signal beam towards the alignment area.

4. A method according to claim 3 wherein the first alignment target comprises an angled reflective surface to reflect the first signal beam back to the autonomous vehicle, such that a first beam path length depends on a location of incidence of the first signal beam on the angled reflective surface.

5. A method according to claim 1 wherein the first alignment target comprises a reflective alignment area to reflect the first signal beam back to the autonomous vehicle if the autonomous vehicle is aligned with the first alignment target, and an absorptive area to absorb the first signal beam if the autonomous vehicle is not aligned with the first alignment target.

6. A method according to claim 1, wherein the first signal beam and the second signal beam are orientated to emit light towards different locations.

7. An apparatus comprising an autonomous vehicle, the autonomous vehicle comprising:
a first laser at a first location on the autonomous vehicle and a second laser at a second location on the autonomous vehicle different from the first location, wherein the first laser is to emit light in a different direction to the second laser;
a first sensor to receive light from the first laser after reflection back towards the autonomous vehicle from a first alignment target while the autonomous vehicle is moving on its own into alignment with the first alignment target, wherein the autonomous vehicle is on a planar surface; and
processing circuitry to receive sensor data from the first sensor and determine that the autonomous vehicle is aligned with the first alignment target based on the sensor data from the first sensor; and
in response, to stop the autonomous vehicle when the autonomous vehicle is in alignment with the first alignment target and output a signal indicating that the autonomous vehicle is aligned with the first alignment target.

8. An apparatus according to claim 7, further comprising
a second sensor to receive light back from the second laser after reflection back towards the autonomous vehicle from a second alignment target, wherein the processing circuitry is to determine that the autonomous vehicle is aligned with the second alignment target based on the sensor data from the second sensor; and
in response, to output a signal indicating that the autonomous vehicle is aligned with the second alignment target.

9. An apparatus according to claim 8 wherein the processing circuitry is to determine, based on sensor data received from the first and second sensors, that the autonomous vehicle is not aligned with both the first and second alignment targets, and
in response, to control a motion control system of the autonomous vehicle to adjust at least one of a position and an orientation of the autonomous vehicle.

10. An apparatus according to claim 9 wherein the processing circuitry is to determine, based on the sensor data received from the first and second sensors, which direction to move the autonomous vehicle.

11. An apparatus according to claim 7 wherein the first laser is mounted on the autonomous vehicle to emit light in a direction parallel to a movement direction of the autonomous vehicle and the second laser is mounted on the autonomous vehicle to emit light in a direction perpendicular to the movement direction.

12. An apparatus according to claim 7 further comprising
an alignment target comprising a reflective alignment area to reflect light emitted by the first laser back to the autonomous vehicle if the autonomous vehicle is aligned with the first alignment target, and
an absorptive area to absorb light emitted by the first laser if the autonomous vehicle is not aligned with the first alignment target.

13. An apparatus according to claim 7 further comprising a reflective target comprising an angled reflective surface to reflect light emitted by the first laser back to the autonomous vehicle.

14. A tangible non-transitory machine-readable medium comprising a set of instructions which, when executed by a processor cause the processor to:
control an autonomous vehicle, including first and second lasers and first and second sensors, wherein the first laser is orientated in a direction perpendicular to the second laser, wherein the autonomous vehicle is on a planar surface, to:
emit light from the first and second lasers;
move the autonomous vehicle;
receive, by the first sensor, a reflected signal of light emitted by the first laser from a first target, while the autonomous vehicle is moving on its own into alignment with the first target;
receive, by the second sensor, a reflected signal of light emitted by the second laser from a second target, the reflected signal of light emitted by the second laser meeting at least one predetermined criterion, while the autonomous vehicle is moving on its own into alignment with the second target;
stop the autonomous vehicle when the autonomous vehicle is in alignment with the first target and the second target; and
output a signal indicating that the autonomous vehicle is aligned to the first and second target.

15. A tangible non-transitory machine-readable medium according to claim 14, wherein controlling the autonomous vehicle to move comprises
receiving sensor data representing a reflected signal from the first target and a reflected signal from second target and
controlling the autonomous vehicle to move in a particular direction based on the received sensor data.

* * * * *